US008806752B2

(12) United States Patent
Reitmeier

(10) Patent No.: US 8,806,752 B2
(45) Date of Patent: Aug. 19, 2014

(54) MICRO-FLUID EJECTION DEVICE AND METHOD FOR ASSEMBLING A MICRO-FLUID EJECTION DEVICE BY A WAFER-TO-WAFER BONDING

(75) Inventor: Zachary Justin Reitmeier, Lexington, KY (US)

(73) Assignee: Funai Electric Co., Ltd., Osaka (JP)

(*) Notice: Subject to any disclaimer, the term of this patent is extended or adjusted under 35 U.S.C. 154(b) by 0 days.

(21) Appl. No.: 13/407,865

(22) Filed: Feb. 29, 2012

(65) Prior Publication Data

US 2012/0152894 A1 Jun. 21, 2012

Related U.S. Application Data

(62) Division of application No. 13/072,851, filed on Mar. 28, 2011, now abandoned, which is a division of application No. 12/266,613, filed on Nov. 7, 2008, now abandoned.

(51) Int. Cl.
*B21D 53/76* (2006.01)
*B23P 17/00* (2006.01)
*B41J 2/135* (2006.01)

(52) U.S. Cl.
USPC .......... 29/890.1; 347/44

(58) Field of Classification Search
CPC ...... B41J 2/1603; B41J 2/1626; B41J 2/1631; B41J 2/1623
USPC .......... 29/890.1; 347/44
See application file for complete search history.

(56) References Cited

U.S. PATENT DOCUMENTS

| | | | | |
|---|---|---|---|---|
| 6,402,301 | B1 * | 6/2002 | Powers et al. | 347/63 |
| 6,502,926 | B2 * | 1/2003 | Cook et al. | 347/63 |
| 6,592,205 | B2 * | 7/2003 | Pearson et al. | 347/42 |
| 6,641,254 | B1 * | 11/2003 | Boucher et al. | 347/50 |
| 6,890,067 | B2 * | 5/2005 | Hock et al. | 347/71 |
| 7,585,055 | B2 * | 9/2009 | Nystrom et al. | 347/62 |
| 7,938,513 | B2 * | 5/2011 | Anderson et al. | 347/65 |
| 2009/0176322 | A1 * | 7/2009 | Joyner et al. | 438/21 |

* cited by examiner

*Primary Examiner* — David Angwin

(74) *Attorney, Agent, or Firm* — Amster, Rothstein & Ebenstein LLP

(57) ABSTRACT

A micro-fluid ejection device is assembled by wafer-to-wafer bonding at a temperature below about 150° C. a first silicon oxide layer of a first wafer, having flow features patterned in the first silicon oxide layer on an actuator chip in a first silicon substrate of the first wafer, to a second silicon oxide layer of a second wafer, defining a nozzle plate on a second silicon substrate of the second wafer. Nozzle holes are formed in the nozzle plate in alignment with actuator elements of the actuator chip of the first wafer either before or after bonding the first and second wafers together. The second silicon substrate of the second wafer is used as a handle and then removed from the silicon oxide layer of the second wafer after bonding the first and second wafers together.

5 Claims, 2 Drawing Sheets

MICRO-FLUID EJECTION DEVICE AND METHOD FOR ASSEMBLING A MICRO-FLUID EJECTION DEVICE BY A WAFER-TO-WAFER BONDING

This application claims priority and benefit as a division of U.S. patent application Ser. No. 13/072,851, filed Mar. 28, 2011 now abandoned, and having the same name, which in turn claims priority and benefit as a division of U.S. patent application Ser. No. 12/266,613, filed Nov. 7, 2008 now abandoned, and having the same name.

BACKGROUND

1. Field of the Invention

The present invention relates generally to micro-fluid ejection devices and, more particularly, to a micro-fluid ejection device and a method for assembling the micro-fluid ejection device by wafer-to-wafer bonding.

2. Description of the Related Art

Micro-fluid ejection heads or devices are broadly useful for ejecting a variety of fluids including inks, cooling fluids, pharmaceuticals, lubricants and the like. One widely-practiced use of a micro-fluid ejection device is as an inkjet printhead in an inkjet printer. The primary components of the inkjet printhead are an actuator chip, a nozzle plate attached to or integrated with the actuator chip, and a flexible circuit for electrically connecting the actuator chip to the printer during use. The actuator chip is typically made of a silicon substrate and contains various layers built up into stack form at a front surface of the silicon substrate using well-known microelectronic fabrication techniques.

Fluid ejection actuators formed on the substrate surface of the actuator chip may be thermal actuators or piezoelectric actuators. For thermal actuators, typically scores of microscopic resistive heater elements are defined in a resistive layer, each resistive heater element being aligned with and corresponding to one of scores of microscopic nozzle holes in the nozzle plate for heating and ejecting a fluid, such as ink, from the nozzle hole toward a desired substrate or target, which in the case of an inkjet printhead is usually print media. It can be readily appreciated that slight misalignment of the nozzle holes with the heater elements can adversely affect the quality of the print made on the print media.

The realization of ultimate inkjet print quality is influenced by several factors, of which one important driving force is the precise placement of ink drops on the print media upon expulsion from the nozzle holes of the inkjet printhead nozzle plate. Currently, the most prevalent techniques for nozzle plate formation are the so-called "pick and place" of polymer nozzle plates with pre-formed nozzle holes, and the photoimagable polymers in which the nozzle holes are formed once the polymer is applied to the chip. These photoimagable polymers may be spun on or laminated. These technologies are limited by shortcomings in accuracy and precision with which the nozzle holes can be located over the heater elements on the chip, thereby adversely affecting print quality. The "pick and place" method of nozzle plate formation is severely limited by the alignment tolerances associated with the placement of the nozzle plate and also by the shortcoming in accuracy and precision of the laser ablation process typically used to form the nozzle holes. The photoimagable processes, although an improvement, are still limited by the materials mismatch between the polymer nozzle plate and silicon wafer leading to differential expansion/contraction with thermal cycling and also by the inherent instability and flexibility of polymer materials. For example, problems such as sagging of the nozzle material over the ink via and distortion of features due to internal stresses are easy to imagine. Additionally, since the nozzle holes are formed by wet chemical development of a photo-exposed area, the nozzle hole size and shape can be difficult to control. All of these factors can degrade print quality by affecting the placement and/or geometry of the nozzle holes.

A third technique for nozzle plate formation is to deposit a thin film over a sacrificial polymer material, pattern the film to form nozzle holes, and subsequently remove the polymer in order to form the ejector chamber. This method for forming a nozzle hole has the benefit of using a ceramic or metallic film as the nozzle layer, thereby improving compatibility with the substrate and providing improved rigidity and thermal stability. However, this method requires depositing a film over the top of a polymer and thus represents a trade-off between a polymer capable of withstanding thin film deposition temperatures and a thin film that can be deposited to sufficient thickness and with desired properties at a moderate temperature to prevent polymer decomposition. Additionally, this process typically results in a very irregular and undulating surface, which may present maintenance concerns.

Thus, there continues to be a need for an innovation that will improve the components of the inkjet printhead and their assembly to one another in order to improve or enhance print quality.

SUMMARY OF THE INVENTION

The present invention meets some or all of the foregoing discussed needs by providing an innovation that overcomes problems in prior art techniques. Underlying the innovation of some embodiments is an insight by the inventor(s) herein that a micro-fluid ejection device capable of ejecting an expanded range of diverse micro-fluids can be most efficaciously assembled by wafer-to-wafer bonding of two separate silicon wafers together at an interface between two aligned silicon oxide layers on the two silicon wafers with the assistance of a silicon substrate of a given one of the wafers used as a handle, which is then removed after the bonding of the wafers to one another. The silicon oxide layer of the given one wafer that provides the nozzle plate for the micro-fluid ejection device is patterned with nozzle holes either pre-bonding or post-bonding of the wafers together. The wafer-to-wafer bonding of the silicon oxide nozzle plate to the patterned silicon oxide flow features of the actuator chip to assemble the micro-fluid ejection device provides benefits over the prior art techniques in terms of improved location, size and shape control of the nozzle holes and improved mechanical and chemical integrity of the nozzle plate itself. Also, since silicon is not an organic polymer, but an inorganic material, the silicon nozzle plate does not constrain the micro-fluid ejection device to use only with an aqueous system nor is it subject to swelling. The device can be used with a host of ejector solvents not realized with any previous devices with polymer-based nozzle plates. Further, the use of silicon eliminates concern for via sag or ink/nozzle plate interactions since the benefits of silicon are realized in terms of mechanical integrity and chemical resistance.

Accordingly, in an aspect of the present invention, a micro-fluid ejection device includes an actuator chip in a first wafer adjacent a front surface of a first silicon substrate thereof also having a back surface opposite the front surface, at least one fluid supply passage in the first silicon substrate between the front and back surfaces and at least one actuator element on the front surface, a flow feature patterned in a first silicon oxide layer on the front surface of the first silicon substrate so as to define at least one ejection chamber overlying the actuator element of the actuator chip and in flow communication with the fluid supply passage, and a nozzle plate in a second wafer defined by a second silicon oxide layer thereof attached by a wafer-to-wafer bond formed at a temperature below about 150° C. to the flow features of the first silicon oxide layer of the first wafer at an interface between the first and second wafers, the nozzle plate having at least one nozzle hole substantially in alignment with the actuator element of the actuator chip and defined through the nozzle plate from an interior surface contiguous with the ejection chamber to an exterior surface thereof.

In another aspect of the present invention, a method for assembling a micro-fluid ejection device includes wafer-to-wafer bonding at a temperature below about 150° C. an actuator chip-and-flow features silicon oxide layer-bearing first wafer and a nozzle plate silicon oxide layer-bearing second wafer at a silicon oxide layer-to-silicon oxide layer interface between the first and second wafers. The assembling method also includes removing a silicon substrate handle from the second wafer after bonding the first and second wafers together. The assembling method further includes forming nozzle holes in the nozzle plate defined by the silicon oxide layer of the second wafer after said bonding of the first and second wafers together and after said removing of said silicon substrate handle.

In yet another aspect of the present invention, a method for assembling a micro-fluid ejection device includes positioning separate first and second wafers together such that the wafers form an interface at respective first and second silicon oxide layers on corresponding first and second silicon substrates of the respective first and second wafers, and wafer-to-wafer bonding the first and second wafers together at the interface of the first and second silicon oxide layers at a temperature below 150° C. such that flow features patterned in the first silicon oxide layer on an actuator chip in the first silicon substrate of the first wafer are bonded to a nozzle plate defined in the silicon oxide layer on the second silicon substrate of the second wafer. The assembling method further includes removing the second silicon substrate from the second silicon oxide layer of the second wafer after bonding the first and second wafers together.

BRIEF DESCRIPTION OF THE DRAWINGS

Figure 1:
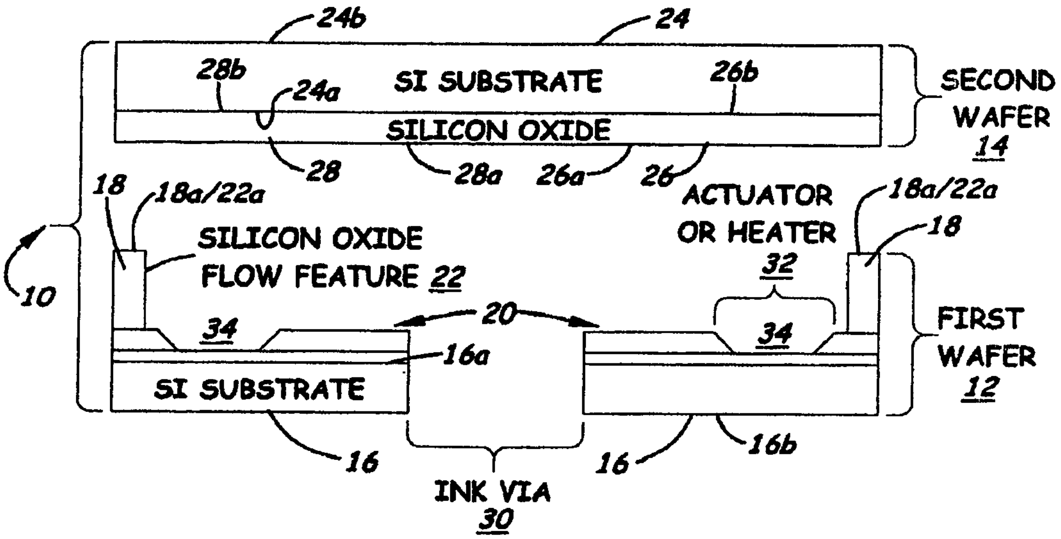

Having thus described the invention in general terms, reference will now be made to the accompanying drawings, which are not necessarily drawn to scale, and wherein:

FIG. 1 is a cross-sectional representation, not to scale, of an exemplary embodiment of separate first and second wafers employed in a method for assembling a micro-fluid ejection device according to the present invention.

Figure 2:
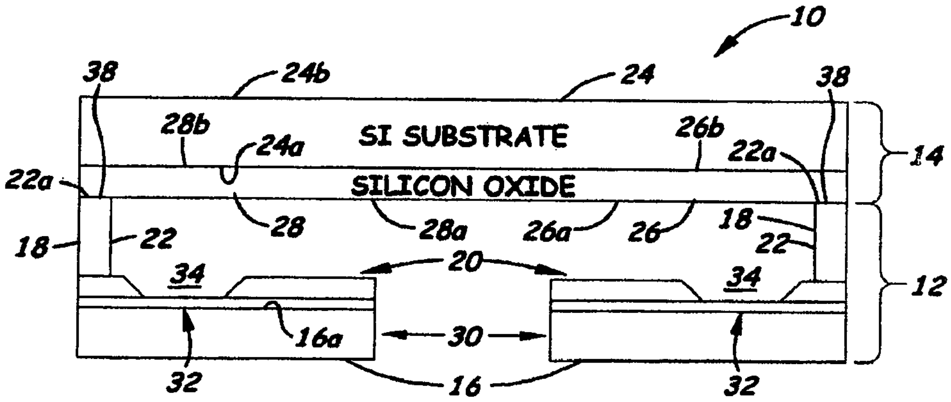

FIG. 2 is a cross-sectional representation, not to scale, of the first and second wafers after being wafer-to-wafer bonded together at an interface of first and second silicon oxide layers of the respective first and second wafers and before removal of a silicon substrate from the second silicon oxide layer of the second wafer.

Figure 3:
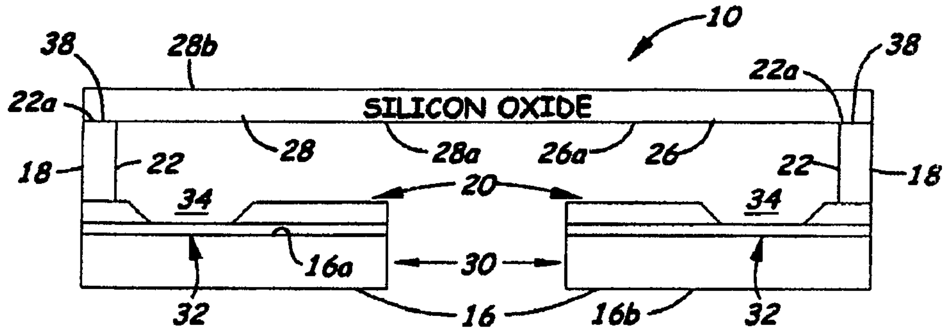

FIG. 3 is a cross-sectional representation, not to scale, of the first and second wafers similar to that of FIG. 2, but after removal of the silicon substrate from the second silicon oxide layer of the second wafer.

Figure 4:
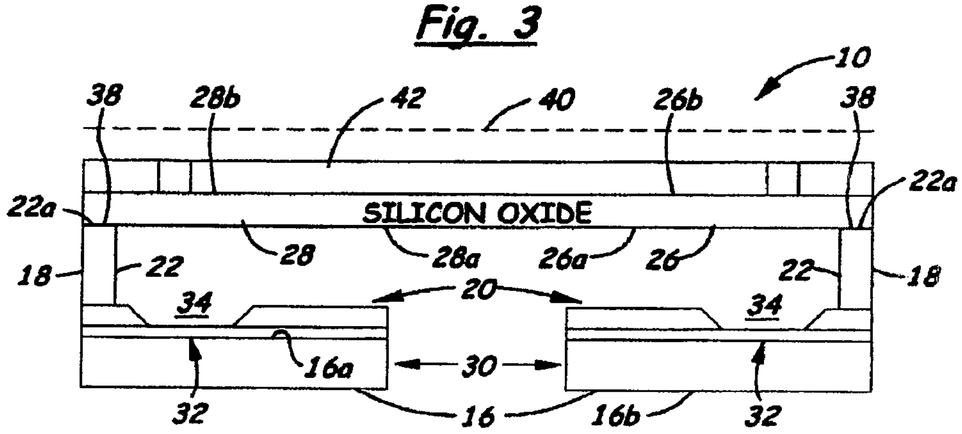

FIG. 4 is a cross-sectional representation, not to scale, of the first and second wafers similar to that of FIG. 3, but now showing patterning and etching of nozzle holes in a nozzle plate defined by the second silicon oxide layer of the second wafer.

Figure 5:
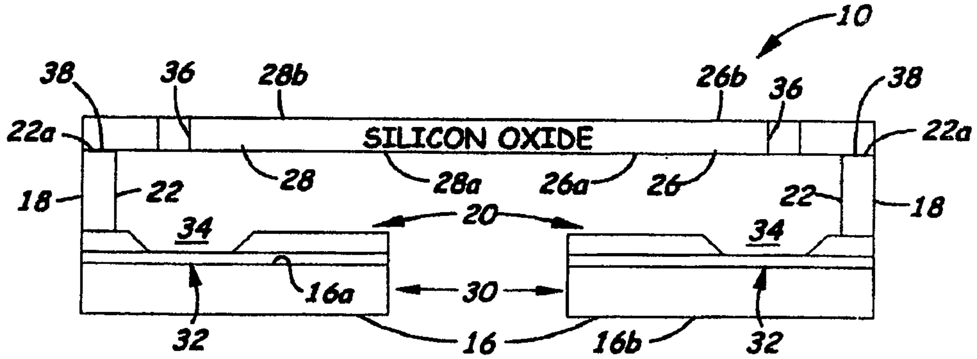

FIG. 5 is a cross-sectional representation, not to scale, of the micro-fluid ejection device of the present invention assembled from the first and second wafers in accordance with the method of the present invention.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Also, the present invention applies to any micro-fluid ejection device, not just to heater stacks for thermal inkjet printheads. While the embodiments of the present invention will be described in terms of a thermal inkjet printhead, one of ordinary skill will recognize that the invention can be applied to any micro-fluid ejection system.

Referring now to the drawings, there is illustrated in FIG. 5 a completed micro-fluid ejection device, generally designated 10, of the present invention, as assembled in accordance with the method of the present invention starting with the first and second wafers 12, 14, as shown in FIG. 1. As can be best understood with reference to FIG. 1, the first wafer 12 is comprised of a first silicon substrate 16 and a first silicon oxide layer 18 on a front surface **16*a* of the first substrate 16. The first silicon substrate 16 has multiple actuator chips 20 formed thereon, by using well-known microelectronic fabrication techniques, and with multiple flow features 22 overlying the actuator chips 20, being patterned in a well-known manner in the silicon oxide layer 18 on the front surface 16*a* of the first silicon substrate 16. The second wafer 14 is comprised of a second silicon substrate 24 and a second silicon oxide layer 26 on a front surface 24*a* of the second substrate 24 to provide multiple nozzle plates 28 for the multiple actuator chips 20. The actuator chips 20 of the first wafer 12 also have at least one fluid supply passage 30, such as in the form of an ink via, formed in the first silicon substrate 16 between its front and back surfaces 16*a*, 16*b* and heater or actuator elements 32 formed on the front surface 16*a* which together with the flow features 22 and nozzle plate 28 defines ejection chambers 34 in flow communication with the fluid supply passage 30. For the sake of simplicity and brevity in order to enable a complete and thorough understanding of the present invention, the micro-fluid ejection device 10 and the method of assembling the device 10** in accordance with the present invention are illustrated in the drawings in a simplified form.

The second silicon oxide layer 26 can be of a range of thicknesses that are sufficient to form the nozzle plate 28. The particular thickness selected will be based on the particular ejector device design. By way of example, the second silicon oxide layer 26 can range from 1.0 microns to fifty microns in thickness. In some embodiments, the thickness will be about ten microns. No patterning is required on the second wafer 14, at least none other than to form holes 36 through the nozzle plate 28. The silicon oxide layer 26 on the second wafer 14 may be formed by thermal oxidation of the second silicon substrate 24 or by deposition of silicon oxide by, e.g., plasma enhanced chemical vapor deposition (PECVD).

Turning now to FIG. 2, there is illustrated a first stage in the method for assembling the device 10, in which wafer-to-wafer bonding at a temperature below about 150° C. of the first and second wafers 12, 14 together takes place at an interface 38 between the flow features 22 patterned in the silicon oxide layer 18 of the first wafer 12 and the nozzle plate 28 defined in the silicon oxide layer 26 of the second wafer 14. More particularly, the separate first and second wafers 12, 14 of FIG. 1 are brought together or positioned in a flush contacting relationship as seen in FIG. 2 such that they interface at 38 with one another at the facing surfaces 18*a*, 26*a* of their respective first and second silicon oxide layers 18, 26 coated on the corresponding first and second silicon substrates 16, 24 of the wafers 12, 14. For facilitating such positioning, the second silicon substrate 24 of the second wafer 14 can be used as a handle. Then, wafer-to-wafer bonding the first and second wafers 12, 14 together at the interface 38 of the first and second silicon oxide layers 18, 26, often at a temperature below 150° C. proceeds. The wafer-to-wafer bonding is best accomplished through fusion bonding which is a process by which a silicon-oxide-to-silicon-oxide bond can be formed at moderate temperatures, well below the maximum threshold for CMOS devices. The fusion bonding process is generally well-known. One reference in which it is described in detail is by Berthold, Jakobly & Vellekoop, in "Wafer-to-wafer fusion bonding of oxidized silicon to silicon at low temperatures", Elsevier, Sensors and Actuators A 68 (1998) p. 410-413. The process basically consists of cleaning, pre-bonding, inspection and subsequent re-bonding, if necessary, and vacuum annealing.

Referring now to FIG. 3, after the bonding is accomplished, in the next stage of the assembling method, the handle formed by the second silicon substrate 24 of the second wafer 14 is removed from the back side 26*b* of the second silicon oxide layer 26 so as to leave only the nozzle plate 28 having opposite interior and exterior surfaces 28*a*, 28*b* as defined by the second silicon oxide layer 26 of the second wafer 14 on the first wafer 12. The interior surface 28*a* of the nozzle plate 28 is contiguous with the ejection chamber 34 and the exterior surface 28*b* is what remains after removal of the second silicon substrate 24. Thus, in some embodiments, the second silicon substrate 24 can serve as a temporary handle wafer for the silicon oxide layer 26 which defines the nozzle plate 28. Its use as a handle allows for the inexpensive use of reclaimed wafers without stringent requirements on doping, surface finish, thickness, etc. The second silicon substrate 24 can be removed by several methods, such as, grinding and polishing, dry etching (i.e. DRIE), wet chemicals (e.g. alkali-OH), or some combination of these methods. The resulting assembly is represented in FIG. 3. It is conceivable that a wet-chemical process could be developed and used in which this sacrificial wafer can be removed in conjunction with ink via formation from the backside of the second wafer 14.

Turning now to FIG. 4, after removal of the second silicon substrate 24 of the second wafer 14, the remaining stages of the assembling method of the present invention involve the patterning and etching of the nozzle holes 36 into the silicon oxide nozzle plate 28 between its interior and exterior surfaces 28*a*, 28*b*. The patterning is accomplished by use of a mask 40 and application of photoresist layer 42 on the nozzle plate 28 as well-known under principles of conventional photolithography. An advantage of removing the second substrate "handle" from the second wafer 14 is that the silicon oxide nozzle plate 28 is now optically transparent and alignment for nozzle hole patterning can be carried out on a shot-by-shot basis to provide the optimum alignment of nozzle holes 36 and heater or actuator elements 32. The etching of nozzle holes 36 can be performed by vapor, dry, or wet means.

Thus, the completed the micro-fluid ejection device 10 includes the actuator chip 20 formed adjacent to the front surface 16*a* of the first silicon substrate 16 of the first wafer 12 having opposite front and back surfaces 16*a*, 16*b*, at least one fluid supply passage 30 formed in the actuator chip 20 between the front and back surfaces 16*a*, 16*b* and at least one actuator element 32 formed on the front surface 16*a*, the flow features 22 patterned in the first silicon oxide layer 18 on the front surface 16*a* of the first silicon substrate 16 of the first wafer 12 so as to define at least one ejection chamber 34 overlying the actuator element 32 of the first wafer 12 and defined in flow communication with the fluid supply passage 30, and the nozzle plate 28 defined by the second silicon oxide layer 26 attached by the interface bond formed at a temperature below about 150° C. on the front surface 22*a* of the flow features 22 of the first silicon oxide layer 18. The nozzle plate 28 has a nozzle hole 36 defined through its thickness and substantially in alignment with each actuator element 32 of the actuator chip 20. Assembling the micro-fluid ejection device 10 include wafer-to-wafer bonding at a temperature below about 150° C. the silicon oxide layer-bearing first wafer 12 to the actuator chip-and-silicon oxide flow features layer-bearing second wafer 14 at the silicon oxide layer-to-silicon oxide layer interface 38 between the first and second wafers 12, 14. Assembling the device 10 further includes, after bonding the first and second wafers 12, 14, removing the silicon substrate 24 of the second wafer 14 from the silicon oxide layer 26 thereof after it has been used as a handle to position the second wafer 14 relative to the first wafer 12. Assembling the device 10 also includes forming nozzle holes 36 in the nozzle plate 28 defined by the silicon oxide layer 18 of the first wafer 12 either pre-bonding or post-bonding the first and second wafers 12, 14.

There are several advantages of the device 10 and assembling method of the present invention over the prior art nozzle plate formation techniques. Compared to the polymer-based nozzle plates, various embodiments of the present invention provide: better alignment of nozzle holes 36 and heater or actuator elements 32 due to improved materials compatibility as well as the nozzle formation process itself; greater mechanical integrity—no concerns for via sag; better reproducibility of nozzle hole size and shape due to using masked and etched, rather than developed, nozzle holes 36; better reproducibility of nozzle plate 28 thickness due to the controllability of silicon oxide deposition or growth relative to that of polymer spin coating; new regimes of nozzle hole sizes available in view that etching the nozzle holes 36 should allow for much smaller nozzle hole diameters and thus smaller drop sizes, relative to photolithographically-developed or laser ablated holes in a polymer; compatibility with non-aqueous inks, i.e. alternative materials could be jetted that are not compatible with current polymer-based nozzle plates; and improved barrier to ink resulting in reduced risk of corrosion. Relative to the sacrificial polymer plus deposited film method, embodiments of the present invention: do not require a sacrificial polymer layer, removing compatibility concerns with depositing a thick film on top of a polymer; and have reduced surface roughness in that resultant surface of the chip/flow feature/nozzle plate assembly will be very flat compared to the undulating surface of the three technologies mentioned above. Finally, some embodiments of the present invention result in: better control of nozzle plate thickness by no longer requiring the silicon to be partially thinned; and ease of mask alignment due to optical transparency rather than IR transparency.

In summary, the present invention describes a new approach for assembling a silicon oxide nozzle plate 28 on an actuator chip 20. These methods can result in a nozzle plate 28 with improved performance relative to nozzle plates described in the prior art. As discussed, the nozzle holes 36 have improved registration relative to the heater or actuator elements 32, and improved control of size and shape and the nozzle plate 28 overall demonstrates improved planarity and greater resistance to corrosion. Some features of the present invention can include: at least two starting wafers 12, 14—the first wafer 12 containing the inkjet chips 20 and silicon oxide flow features 22 and the second wafer 14 a silicon oxide-on-silicon wafer; the second wafer 14 does not need to be patterned or processed further; the second wafer 14 optionally serves only as a handle wafer for the silicon oxide layer 26 that will serve as the nozzle plate 28; wafer bonding of first and second wafers 12, 14 using fusion bonding; removal of the silicon of the second wafer 14; and formation of nozzle holes 36 in the remaining silicon oxide layer 26 after attaching the second wafer 14 to the first wafer 12.

The foregoing description of several embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A method for assembling a micro-fluid ejection device, comprising:

positioning separate first and second wafers together, the first wafer comprising a first silicon substrate, a first silicon oxide layer disposed on the first silicon substrate and flow features patterned in the first silicon oxide layer, the second wafer comprising a second silicon substrate, a second silicon oxide layer disposed on the second silicon substrate and a nozzle plate defined by the second silicon oxide layer, such that the wafers meet at an interface between the first and second silicon oxide layers; and after the positioning step, wafer-to-wafer bonding the first and second wafers together at the interface at a temperature between 90° C. and 150° C. such that the flow features patterned in the first silicon oxide layer of the first wafer are bonded to the nozzle plate defined by the second silicon oxide layer of the second wafer.

2. The method of claim 1, further including removing the second silicon substrate from the second silicon oxide layer of the second wafer after said bonding of the first and second wafers together.

3. The method of claim 2, further including forming nozzle holes in the nozzle plate after said wafer-to-wafer bonding of the first and second wafers and after said removing of the second silicon substrate from the second silicon oxide layer of the second wafer.

4. The method of claim 3, wherein said forming nozzle holes in the nozzle plate includes optically aligning the nozzle plate with the actuator elements of the actuator chip through the second silicon oxide layer forming the nozzle plate which is transparent.

5. The method of claim 4, wherein said forming nozzles in the nozzle plate further includes patterning and etching the nozzle holes into the nozzle plate optically aligned with the actuator elements of the actuator chip.

* * * * *